UNITED STATES PATENT OFFICE.

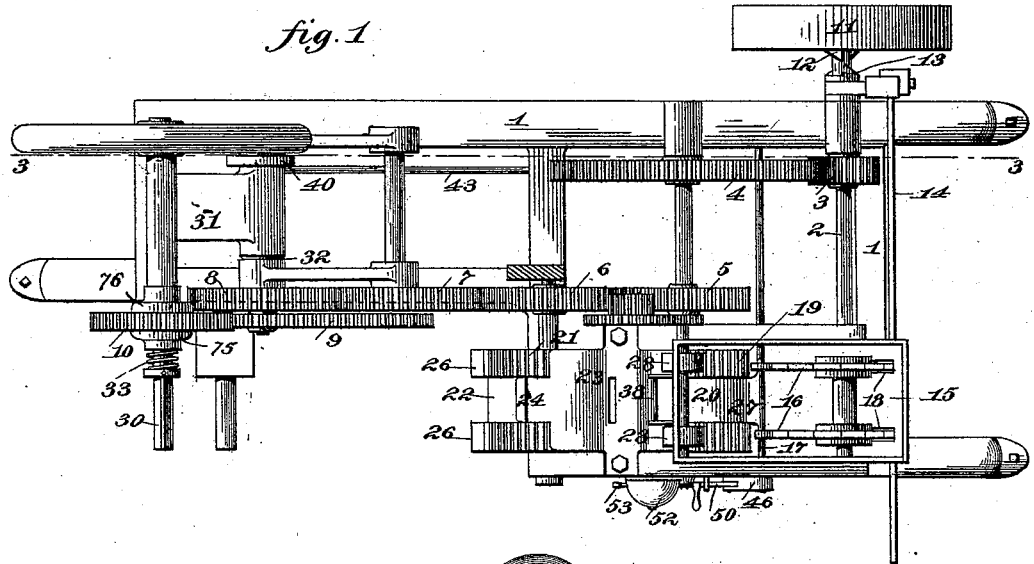

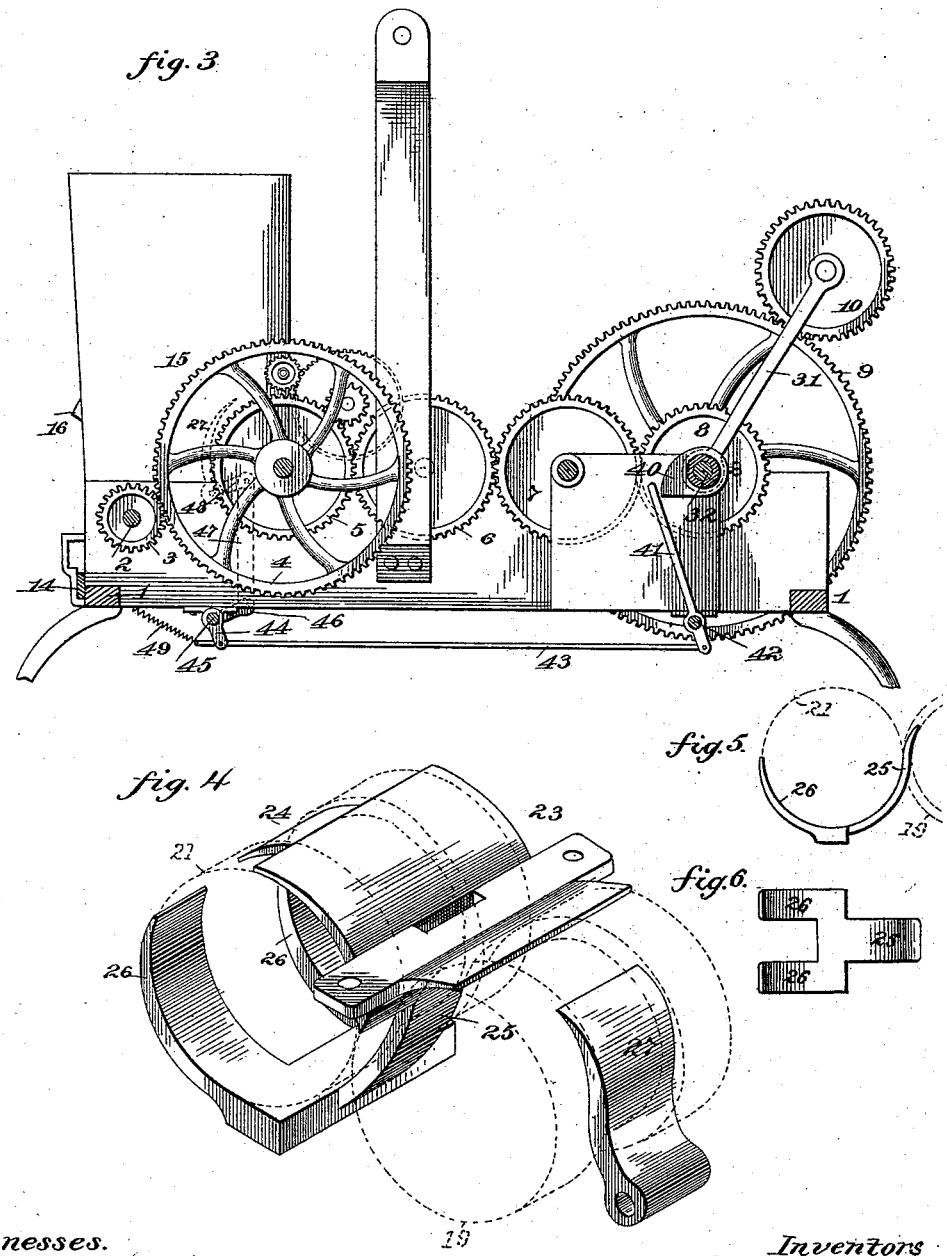

JOHN F. HAMILL, PETER B. LENTZ, AND CHARLES T. COLE, OF YORK, PENNSYLVANIA.

MATCH-SPLINT-BUNDLING MACHINE.

SPECIFICATION forming part of Letters Patent No. 490,963, dated January 31, 1893.

Application filed July 15, 1892. Serial No. 440,117. (No model.)

*To all whom it may concern:*

Be it known that we, JOHN F. HAMILL, PETER B. LENTZ, and CHARLES T. COLE, citizens of the United States, residing at York, in the county of York and State of Pennsylvania, have invented certain new and useful Improvements in Match-Splint-Bundling Machines, of which the following is a specification.

Our invention relates to machines for bunching match splints and it consists in various improvements in the construction and arrangement of such machines, all of which will be fully described in the following specification and illustrated in the accompanying drawings forming part thereof.

Figure 1 of the drawings is a plan view of the complete machine. Fig. 2 is a side elevation, part of the hopper being broken away to show the sorting and feeding mechanism. Fig. 3 is a sectional elevation on the line 3—3 of Fig. 1, and Fig. 4 is a perspective view of the roller protector, belt and splint guide, feeding device and feed check, the splint rollers being shown in dotted outline. Fig. 5 is a side view and Fig. 6 is a plan of the belt and splint guide shown in perspective in Fig. 4.

Similar reference signs indicate like parts throughout the several views.

In the drawings 1 indicates the main frame of the machine and 2 the driving shaft mounted therein. A train of gears numbered 3 to 10 inclusive transmits motion from the driving shaft to various parts of the machine. The pulley 11 is loose upon the driving shaft and carries a clutch member 12 upon its inner side. Another clutch member 13 is splined to the driving shaft and slides upon said shaft into and out of engagement with the driving pulley. The sliding clutch member 13 is operated by an elbow lever 14 by which the machine may be stopped when desired, the driving pulley being run continuously.

The match splints to be bundled are placed in a hopper 15 and rest at the bottom of the hopper upon a pair of serrated or stepped plates 16 which are inclined downwardly and loosely pivoted upon a shaft 17 at their lower ends. The upper ends of the serrated plates extend through slots 18 in the end of the hopper. The plates 16 rest upon a pair of eccentrics 77 which are fixed upon the main shaft, and as the shaft revolves the plates vibrate and feed the splints down their inclined serrated edges to the rollers. From the hopper the splints drop into transverse grooves in the periphery of a roller 19 which revolves partly within and partly outside of the hopper. The roller 19 is about equal in length to the splints and about its middle portion is a circumferential groove 20 equal in width to about one-third the length of the roller. Another roller 21 similar in size and shape to the roller 19 is journaled opposite to it so that their peripheries run close to or touch each other. The roller 21 has a groove 22 similar to the groove 20. The rollers 19, 21 are geared together by the gear wheels 5, 6, which are of equal size and hence they run in opposite directions at the same speed.

A guard plate 23 is bolted to the main frame between and above the rollers and fits close to the peripheries of each of them to prevent the entrance of foreign matter between them. A tongue 24 of the guard plate fits in the groove 22 of roller 21. The guard plate is perforated in the middle to permit the passage of a belt which will be hereinafter described. Beneath the roller 21 and extending up between the rollers is a combined belt guide, splint guide and transfer plate which is best shown in Fig. 4. The said guide and transfer plate consists of a reversely curved plate 25 which extends around roller 21 from the bottom of said roller to its point of contact with roller 19, at which point the curve of the plate reverses and its wedge-shaped end extends into the groove 20 of roller 19, and curved plates 26 which extend in the opposite direction from plate 25 around and close to the transversely grooved portions of the roller 21. Another curved plate 27, which we will call the feed check plate, lies normally within that portion of the groove which is within the hopper. The plate 27 is rigidly connected at its lower end to the rock shaft 17 and the rock shaft may be turned so as to throw the check plate out of groove 20 and thus prevent the splints from getting into the transverse grooves of the roller 19, thus checking or stopping the feeding of the splints. In order to prevent any splints except those in the grooves from passing out of the hopper a roller 28 of rubber or other soft material is located between the upper side of the roller 19 and the adjacent wall of the hopper. The roller 28 is rotated rapidly in the same direction as the roller 19 by suitable gearing which causes their adjacent surfaces to move in opposite directions, and thus any loose splints resting upon the latter roller are thrown back into the hopper.

A removable roller 29 upon which the bunch of matches is wound is splined upon the end of a spindle 30, which spindle is journaled in the outer end of an arm 31. The inner end of the arm 31 is mounted upon the shaft 32 of the gears 8 and 9, and the spindle 30 always remains at the same distance from and parallel to said shaft when the arm is revolved. The gear 10 is frictionally connected to the spindle 30 by being confined between two disks 75 and 76, the disk 76 being fixed to the spindle and the disk 75 being free to slide thereon and pressed against the gear by a spiral spring 33 which is interposed between the disk and a fixed collar. The gear 10 is always in mesh with the larger gear 9 upon the shaft 32.

The splints are rolled between a belt 34 and a band 35. The belt and the band are each wound upon rollers similar to the roller 29 which rollers are splined upon spindles 36, 37, suitably mounted upon the main frame. To produce a proper tension upon the belt and band the spindles are provided with friction disks which are splined upon them and spring pressed against the fixed bearings of the spindles, quite similar to the friction device of the spindle 30. The belt 34 passes down through a guide 38 upon the hopper, then through the hole in the guard plate 23 and around the roller 21, lying in the groove 22 and inside of the splints. The band 35 passes through a guide and then joins the belt, both band and belt being wound upon the roller 29 with the splints between them. The bundle of splints being rolled rests upon the roller 21 and as the bundle grows larger the arm 31 is rotated about its shaft.

By the following connections between the arm 31 and the rock shaft 17 the feeding of splints is automatically stopped when the belt is full, thus preventing any possible overfeeding and choking of the machine. Mounted upon the elongated hub of the arm 31, or otherwise connected to said arm, is a cam 40 upon which bears a lever 41 which is mounted upon a rock shaft 42. The lower end of lever 41 is connected by a rod 43 to an arm 44 upon a rock shaft 45 which extends across the main frame. The rock shaft 45 has on its outer end an arm 46 which is connected by a rod 47 to a similar arm 48 upon the shaft 17 of the check plate. The cam 40 is adjustable upon the hub of the arm 31 by means of a set screw and it thus may be set in position to operate the check plate at any point in the movement of arm 31, or when the bundle is complete, no matter what the length of the belt may be. The lever 41 is constantly pressed toward the cam by a spring or other power, such as the coiled spring 49. After a bundle is complete it is removed and replaced by an empty belt and band.

In order to prevent any splints from being fed to the rollers until the new belt and band are properly adjusted a latch bolt 50 is arranged to spring into a notch 51 in the bar 47 and thus lock the check plate up and prevent feeding until the latch is withdrawn by the attendant.

A gong or bell is connected to the mechanism at some suitable point to indicate to the attendant when the belt is full, thus enabling one person to attend to several machines. As shown, the gong 52 is located above the latch bolt 50 and its hammer 53 is connected to said bolt, so that when the bolt passes into its notch the bell will be struck.

The operation of the machine will be understood by those skilled in the art from the foregoing description. We will therefore simply point out in conclusion the advantages of our improvements.

The vibrating serrated plates forming the bottom of the hopper feed the splints to the notched roller, and at the same time straighten out any splints which may not be parallel with the mass of splints in the hopper. Another and very important function of these plates is to sort out dirt and short or broken splints which drop out between the plates, the latter being separated wide apart for this purpose.

Another important feature is the automatic stoppage of the feed when the belt is full, and the adjustability of the cam whereby the feed may be stopped to suit belts of any length. Also the alarm gong which notifies the attendant when the belt is full. Also the spring bolt for locking and releasing the feeding devices.

The broad central peripheral grooves in the notched rollers are of importance because they permit us to use a broad and strong check plate and transfer plate. The combined splint guide, transfer plate and belt guide is another important feature. The parts of this device are broad and strong and not liable to breakage, whereas devices heretofore used for transferring have been slender curved rods, which rapidly wear away and often break even before they are worn. Furthermore the threading of the belt between the rollers has been a troublesome operation in prior machines. In our machine the transfer plate also forms a belt guide which holds the belt to the roller and guides it around and out to a convenient point for the operator to grasp it. In threading a belt it is only necessary to insert the end into the perforation in the guard plate 23; the roller and belt guide will then carry it through. The peculiar construction of the guard plate 23 and the tension devices for the belt and band rollers are other features of our invention.

What we claim and desire to secure by Letters Patent is;

1. In a match splint bundling machine the combination with the hopper, of a pair of serrated plates separated from each other and forming the bottom of the hopper, and means for vibrating said plates, whereby the perfect splints are supported by the plates while the short splints and other refuse matter are permitted to drop through the opening between the plates, substantially as described.

2. In a match splint bundling machine the combination with the hopper, of a pair of inclined serrated plates, the said plates being separated from each other and pivoted at their lower ends, and a rotating shaft provided with eccentrics upon which the plates rest, the separated plates forming the bottom of the hopper which retains the perfect splints and permits the broken splints and refuse to drop out, substantially as described.

3. In a match splint bundling machine the combination with the hopper of the splint roller 19 having a broad central peripheral groove, the check plate fixed to a rock shaft 17 and lying normally in said groove, and means for automatically raising the check plate from the groove when the belt is full of splints, whereby the feeding of splints from the hopper is automatically stopped, substantially as described.

4. In a match splint bundling machine the combination with the hopper of the splint roller 19 having a broad central peripheral groove, the check plate lying in said groove and fixed to a rock shaft at the lower end of the hopper, the serrated plates loosely pivoted on the rock shaft at each side of the check plate, and means for vibrating the serrated plates, substantially as shown.

5. In a match splint bundling machine, the combination with the splint roller 19, the check plate and the rock shaft 17, of the swinging arm 31, the cam connections to said arm, and connected between the cam and said rock shaft, substantially as shown.

6. In a match splint bundling machine the combination with the splint roller 19, the check plate and the rock shaft of the swinging arm 31, and adjustable connections between the swinging arm and rock shaft whereby the stoppage of the feed may be varied to suit belts of different lengths substantially as shown.

7. In a match splint bundling machine the combination with the splint roller 19, the check plate and the rock shaft 17, of the swinging arm 31, the cam upon the hub of said arm, the lever 41, connecting rod 43, rock shaft 45, arms, 44, 46 and 48, and connecting rod 47, constructed and arranged substantially as described.

8. In a match splint bundling machine the combination with the splint roller 19, the check plate and the rock shaft 17, of the swinging arm 31, connections between the swinging arm and said rock shaft, and a latch for holding the check plate up when raised, substantially as described.

9. In a match splint bundling machine the combination with the splint roller 19, the check plate and the rock shaft to which the checkplate is connected of the rock shaft 45, the arms on said rock shafts the rod connecting said arms and provided with a notch, and the spring bolt arranged to enter said notch when the check plate is raised, substantially as described.

10. The combination with the splint rollers 19, 21, having central peripheral grooves, of the guard plate arranged between and overlapping said rollers said guard plate having a tongue fitting within the groove of said roller 21 and a perforation for the passage of a belt substantially as described.

11. The combination with the splint rollers 19, 21, having broad central peripheral grooves, of the combined splint guide, belt guide and transfer plate consisting of the reversely curved plate 25 fitting the peripheral grooves, and the curved plates 26 fitting the periphery of the roller 21 between the central grooves and its ends, substantially as described.

In testimony whereof we affix our signatures in presence of two witnesses.

JOHN F. HAMILL.
PETER B. LENTZ.
CHARLES T. COLE.

Witnesses:
J. A. ZEIGLER,
REX. M. H. STOUCH.